Dec. 16, 1969 H. E. J. NEUGEBAUER 3,483,777

INFORMATION STORAGE AND RETRIEVAL EMPLOYING THERMAL PERFORATION OF THE RECORD MEMBER

Filed Nov. 1, 1962 3 Sheets-Sheet 1

INVENTOR.
HANS E. J. NEUGEBAUER

BY Stanley Z. Cole

ATTORNEY

INVENTOR.
HANS E. J. NEUGEBAUER
BY
Stanley Z. Cole
ATTORNEY

INVENTOR.
HANS E. J. NEUGEBAUER
BY
Stanley Z. Cole
ATTORNEY

United States Patent Office 3,483,777
Patented Dec. 16, 1969

3,483,777

INFORMATION STORAGE AND RETRIEVAL EMPLOYING THERMAL PERFORATION OF THE RECORD MEMBER

Hans E. J. Neugebauer, Webster, N.Y., assignor to Xerox Corporation, Rochester, N.Y., a corporation of New York Filed Nov. 1, 1962, Ser. No. 234,604
Int. Cl. B26d 7/10
U.S. Cl. 83—16 8 Claims This invention concerns information retrieval and in particular, a method and means for recording documents in a systematic manner whereby a document can be recovered quickly and easily by use of one or a combination of key words.

One such method is popularly known as "Peekaboo." A peekaboo file typically consists of a fixed number of cards in which there is a separate card for each descriptive term in the complete filing system. Each card has positions for as many numbers as there are items to be filed. When an item is recorded it receives a serial number. The numbers are given in regular sequence regardless of the contents of the item. The same number is recorded on all the cards identified by terms which characterize the contents of the particular item. The recording is accomplished by perforating or drilling a hole through each of these cards at the numerical position selected. When it is desired to retrieve all items whose contents relate to a plurality of key terms, the cards corresponding to these terms are placed in register on top of a source of illumination. The perforations where light passes through indicate the serial numbers of all the wanted items. This is one of the simplest methods of information retrieval known today. Nevertheless, there are many difficulties that make this method too troublesome and time-consuming to be accepted as a common working tool in todays business office. The most common embodiment of peekaboo requires that the key term cards, to be examined for retrieval or to be perforated for the recording of a new document, be removed from the remaining cards. Removal of a few select cards from a large group of cards is always a clumsy procedure at best and the need to be repeatedly separate and replace cards from the stack is an added inconvenience. It has been a particular disadvantage that the perforations tend to leave burred edges and waste material between the cards making it difficult to shift the cards with relation to each other. The necessity in the peekaboo method for moving the cards with relation to each other is the one requirement that makes for considerable difficulty in operation of the system. The present invention is directed to reducing the difficulty brought about by this requirement thus eliminating the inconveniences that prevent this method from being placed in more common use.

In accordance with the present invention a method of peekaboo recording and retrieval has been found in which the peekaboo cards are always retained in a given stack, recording perforations are made without introducing interfering material between the cards, and only fractional inch movement of any of the cards is required in order to record or retrieve desired information. Thus, it is an object of the present invention to define a method of information retrieval in which peekaboo cards are always retained in a given stack.

It is a further object of the invention to define a method of making recording perforations in peekaboo cards leaving clean perforated edges and no residual solid material as a result of the perforating operation.

It is a further object of the invention to define a method and means of recording documents on peekaboo cards and retrieving information from peekaboo cards without the necessity of removing the cards from the card file.

It is a further object of the invention to define a card for peekaboo systems particularly adapted for a peekaboo method and means in accordance with the above objectives.

Further objects and features of the invention will become apparent while reading the following description in connection with the drawings wherein.

Figure 1:
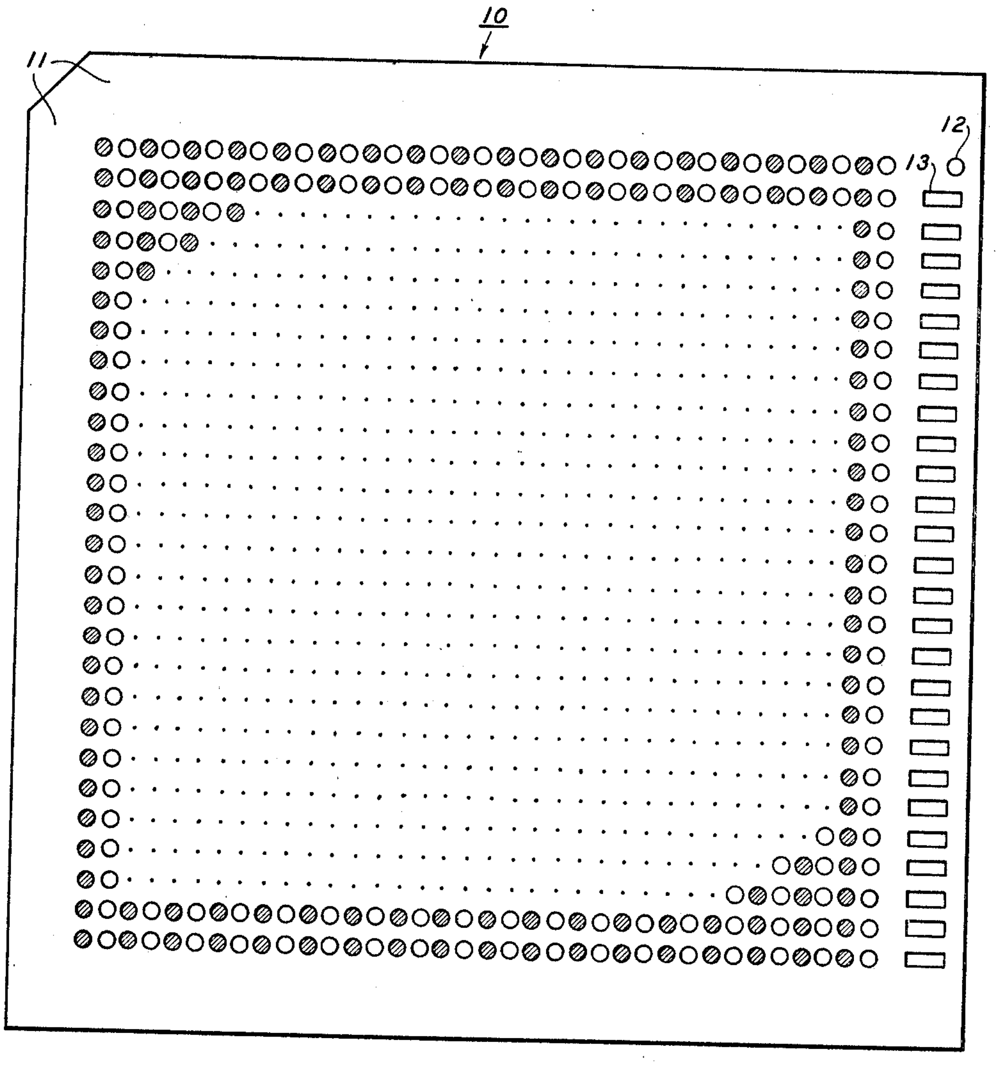
FIGURE 1 is an information retrieval card in accordance with the invention.
Figure 4:
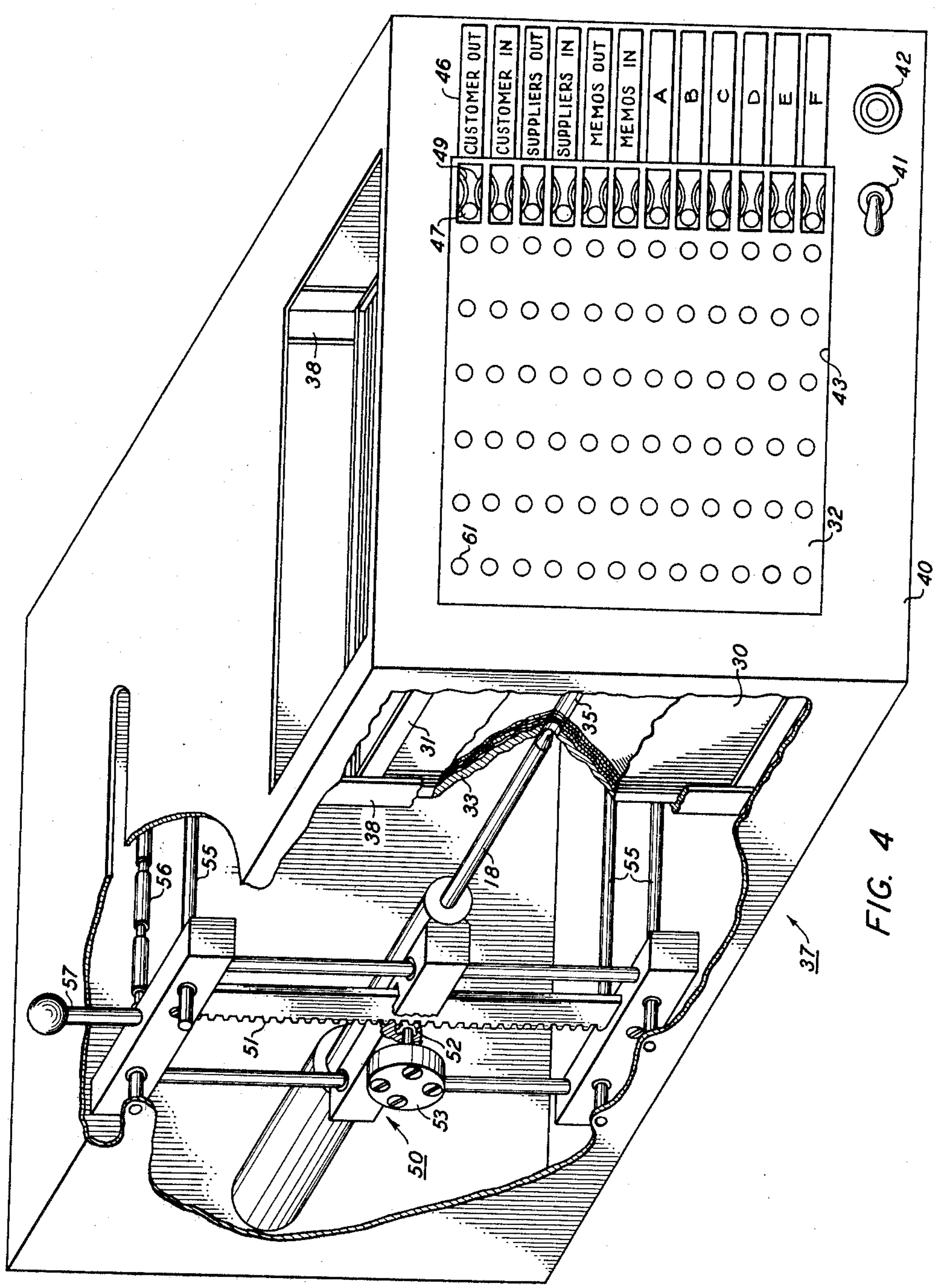
FIGURE 4 is a simplified isometric of an embodiment of peekaboo apparatus in accordance with the invention.

Peekaboo information retrieval cards in accordance with the invention are adapted for the recording and retrieval of indexing information with minimal movement of the file cards. Using the techniques of the present invention the peekaboo cards always remain in their file position and are shifted only a fraction of an inch for recording and retrieval functions. FIGURE 1 illustrates an embodiment of such a card. As illustrated, card 10 is about 8 x 8 inches and has a recording area suited for carrying 972 holes. This recording area is surrounded by margins 11. These margins must be wide enough to enable supporting the card without interfering with the operation of punching and viewing. One margin of the card is adapted to permit selective movement of a card separately of other cards in a stack. In the embodiment of FIGURE 1, this is illustrated as a hole 12 and a series of slots 13. Each card in a stack would have the hole 12 in a different position and would have slots in all other positions so that a pin through the hole in a given card could be used to move that card without moving the remaining cards in the file. Other suitable ways of moving the cards separately can be used such as, for example, tabs on the edges of the cards that can be pulled to move an individual card. When movement of the individual cards is to be effected by the hole and slot method illustrated, the total number of cards in a stack would be limited by the number of slots for which there is room on the card used. On an 8 x 8 inch card such as illustrated with slots of the size and spacing shown, the total number of cards would be thus limited to 27. An additional 27 cards could be added, however, by employing the left-hand margin as well. The number of cards desired in a given system would be determined by the number of terms necessary for adequately classifying the items to be stored. As will be further described, card 10 is comprised of a relatively stiff card of cellulosic composition, plastic, or metal backed with a permanently adherent film of a low melting point plastic. As indicated by the holes on card 10, the card is pre-punched with holes in all 972 locations. However, the plastic film is pre-punched in only the even numbered vertical rows. Cross-hatching in the odd numbered rows is intended to indicate the unperforated plastic film. In the system of the present invention only the odd numbered rows can carry indexing information thus limiting the total number of items that can be indexed on the illustrated card to ½ of the total hole positions or 486. This is true using a center-to-center hole spacing of $^{3}/_{16}$″ horizontally and ¼″ vertically. However, it is readily understood that different spacing and/or different sized cards or margins can be used to vary the number of items that can be indexed in a given set of cards. The purpose of the empty rows of holes as will be more fully explained in connection with FIGURE 4 is to permit the recording of items on selected cards without removal of the cards from the file stack. Thus, if item 1 is to be punched on the card illustrated this card is moved the distance of the center-to-center spacing of the holes, i.e., 3/16", so that the number 1 hole position on this card is over pre-punched holes on all the remaining cards. The punching operation then punches the number 1 position in only this card having moved the card 3/16" for the purpose.

Figures 2, 5:
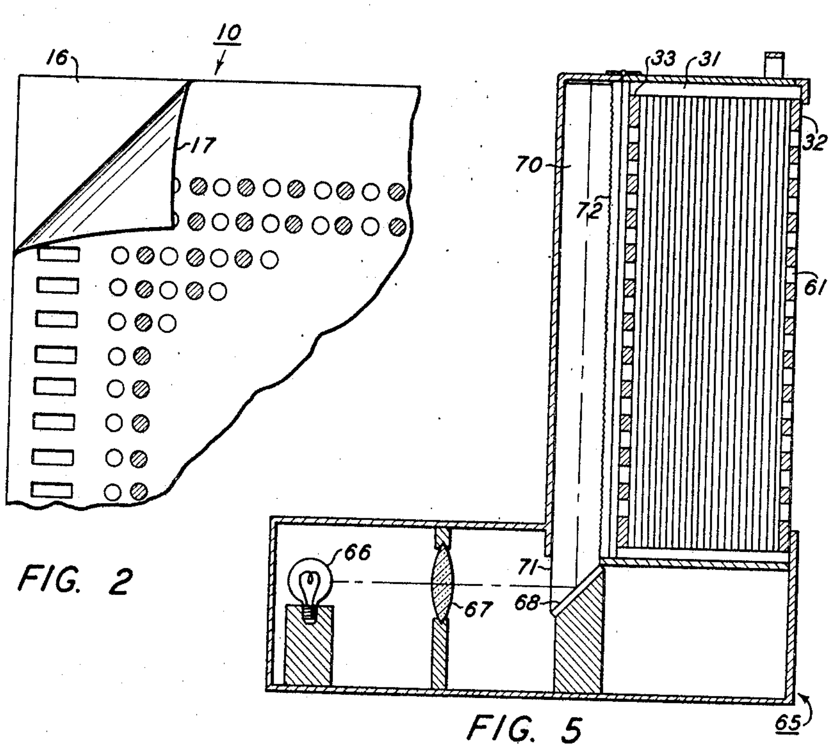
FIGURE 2 is a corner of an information retrieval card detailing the card construction.
FIGURE 5 is a simplified cross-section of peekaboo viewing apparatus.

FIGURE 2 is a reverse view of the upper right-hand corner of card 10 illustrated in FIGURE 1. Card has base material 16 is covered with a film of low melting opaque plastic 17. The card base 16 may be made of any suitable material for making file cards. A smooth-surfaced cardboard such as is generally used in office file cards is preferred due to its low cost and relatively low friction surface. For purposes of the invention the card is readily made by first punching all holes and slots in the card and then bonding the plastic film 17 by a cement or by heat bonding to the back surface of the card. A low melting point polyethylene or other inexpensive plastic that will melt or evaporate at temperatures between 200° and 800° F. is suitable. While the plastic film thickness is not critical, it is preferably thin relative to the card base and is suitably about one quarter mil to two mils thick. The minimum thickness of the plastic film is limited mainly by difficulty of handling in the process of manufacture and the necessity of sustaining adequate pigmentation where some degree of opacity is desired. After the plastic film is bonded to the card a second punching operation removes the plastic film from the slots and the even numbered holes. The virtue of the plastic film is that it facilitates a punching operation that leaves no burr on the card or any residual material that will fall between the cards when they are assembled in a stack.

Figure 3:
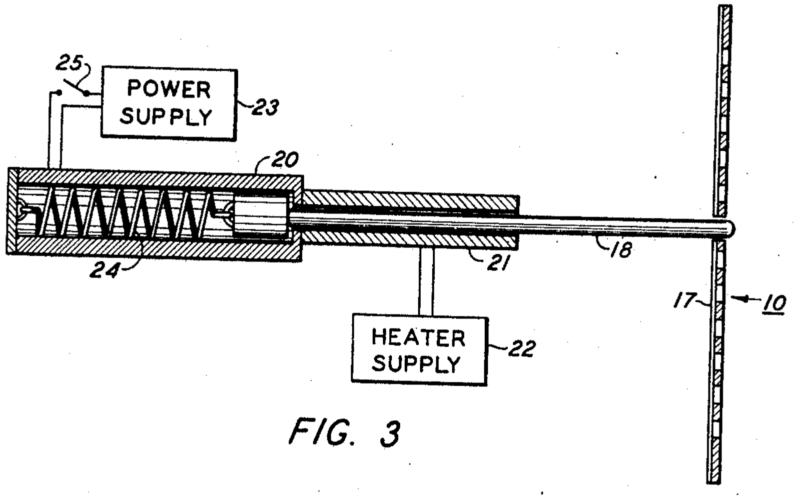
FIGURE 3 is a diagrammatic view of card punching apparatus in accordance with the invention.

An embodiment of a punching device operable with card 10 according to the invention is illustrated in FIGURE 3. This punching device consists of a pin 18 mounted in a solenoid coil 20. Adjacent to the solenoid coil is a cylindrical oven 21 which surrounds and heats pin 18 when the pin is in a retracted position. The heat oven is suitably an electrical heating element supplied by an electrical heater supply 22. Solenoid 20 is supplied by supply 23 and is actuated by switch 25. Closing of the switch as is illustrated causes pin 18 to be extended out beyond oven 21 and through an adjacent hole in file card 10. Upon contact from pin 18, the low melting point plastic film 17 melts away leaving a smooth clean hole with no interfering residue. When switch 25 is released pin 18 is retracted into heat oven 21 by suitable return means such as tension spring 24.

FIGURE 4 illustrates an embodiment of a peekaboo file and recording apparatus in accordance with the invention. This apparatus may be readily designed so that the peekaboo file cards are merely set into a frame that is part of the apparatus. However, it is considered preferable that the file cards have a separate supporting frame in which they can be removed or returned to the recording apparatus without any displacement of the cards. Thus, the cards 30 are illustrated as being supported in a frame 31 which is separable from the recording apparatus. This frame includes a face plate 32 and a backing plate 33 both containing holes corresponding to the holes in the even-numbered rows on the cards in order to permit recording and viewing. The members of the supporting ferred due to its low cost and relatively low friction surface. For purposes of the invention the card is readily frame are adapted to hold the peekaboo file cards in a loose compact stack that holds the cards together without restricting their movement. In this apparatus the cards are maintained in this relatively loose file condition which would prevent punching in any of the more conventional ways used to punch cards. However, since in the present invention, the punching is performed almost entirely by the application of heat and not by pressure, punching while in this loosely filed condition is readily accomplished. The card supporting frame 31 when placed in the recording apparatus 37 is held firmly in a fixed location by positioning members 38.

Looking at front panel 40 of the recording apparatus it will be noted that there is an off-on switch 41 which serves to supply heating current to the punch, and punch-button 42 which serve to operate the punch. An aperture 43 in the panel serves to expose the front plate 32 of a set of file cards. Labels having the descriptive term designations for each of the cards are suitably carried in label slots 46. These are positioned opposite pins 47 which move the appropriate term card. It will be noted that the apparatus of FIGURE 4 is illustrated in a greatly simplified form with fewer term designations and recording hole positions than would be necessary in a practical unit. FIGURE 1 is exemplary of an indexing card for use in a practical apparatus. The punching mechanism 50 is carried on a vertical rack 51 in back of the set of file cards 30. Punching device 50 is supported for movement up and down on the vertical rack by means of pinion gear 52. Pinion gears are normally held immovable by motor 53 which is connected to rotate one-half revolution at the completion of each operation of the punch, as will be further described in discussing the operation of the apparatus. The vertical rack 51 is supported on horizontal tracks 55 and 56. A locking pin controlled by knob 57 serves to position and lock the vertical rack into positions corresponding to the vertical rows on the cards. Track 56 has a slot with enlarged and narrow portions to cooperate with the locking device for positioning and locking the vertical rack in horizontal positions.

For operation, consider a fresh stack of cards inserted into the apparatus. The even rows of holes in the cards are all pre-punched and all fall under rows of holes in the face plate 32 of the stack of cards so that there are continuous holes 35 completely through the stack in each of these positions. No holes are punched in the odd-numbered rows which are covered by the unapertured rows in the face plate. For purposes of description we will assume that this set is being used by a distributor who purchases his sale items given as Model A, Model B, Model C, Model D, Model E, and Model F from suppliers and then sells them in turn to customers. He wishes to file correspondence from and to customers, from and to his suppliers, and also memos internal in his organization, and he wants to be able to file them with cross-reference to the particular sale items that they refer to. To this end he has an item card in his stack for each of these categories. The first letter that he wants to file is from a customer and relates to sales items Model A and Model C. He gives this first document a Serial No. 1 which is also represented by the first position in the No. 1 odd-numbered row on each of the file cards. This numbered position must be punched in three cards; the one for customer-in, and the ones for Model A and Model C. By means of pins 47, each of which engages with a hole in one card only and moves freely in slots in each of the other cards, the three cards representing these terms are moved one row to the right. Spring clips 49 can be utilized to resist the movement of pins 47 so that friction between the cards will not drag the nonselected cards out of position. The No. 1 position in each of these cards falls under a hole 61 in the face plate and in similar holes in each of the other cards in the stack. Pushing button 42 then produces an aperture in this position in the three cards. The cards are then returned to their stored position by pins 47. Heater switch 41 can be left on throughout a day when the punching apparatus is to be used so that punch 18 is maintained in a heated condition. After punching for the first item, retraction of punch 18 causes operation of motor 53 as by tripping a microswitch (not illustrated). Each actuation of motor 53 rotates spur gear 52 through one-half turn dropping the punching mechanism one hole position so that it is ready for recording the next item. After the last hole in a vertical column has been punched, punch mechanism 50 is raised to the uppermost position again and the entire assembly including rack 51 and guide rails is moved horizontally to the next punching position where it is locked into position by know 57 operating a locking pin.

After a number of items have been punched and filed away in numerical order, the peekaboo cards can be used to retrieve the serial numbers of items releated to certain terms. For example, all the items referring to Model A may be located by the holes punched in the card representing the term "A." If it is desired to obtain only the serial numbers of items that are correspondence coming in from customers referring to Model A, this may be obtained by superimposing the "Customer-In" card and the "A" card.

For retrieving the serial number information, it is preferable to supply a uniform source of light to the back side of the stack of cards. Since most systems would likely require a plurality of stacks of cards and most of the searching would be with card stacks that are completely filled with recorded items it is considered preferable, although not necessary, that a separate search or viewing apparatus be utilized. Such an apparatus is illustrated in simplified form in FIGURE 5. The stack of cards, which need never be removed from supporting frame 31, is placed in the viewing apparatus 65. The front panel of the viewing apparatus is generally similar to that of the recording apparatus in FIGURE 4 with the exception of the switches. One switch only is required to operate source of illumination 66. Source of illumination 66 is arranged to illuminate optical system 67 which focuses the light on mirror surface 68. Positioned facing the rear of the stack of cards in the viewing apparatus is a transparent glass or plastic plate 70. The lower edge of this plate 70 is cut off at an angle and coated with an evaporated metallic coating or the like to provide mirror surface 68. The rearmost surface 71 of transparent plate 70 is cut or polished to a smooth finish providing internal reflection of light reflected from mirror surface 68. The foremost surface 72 of transparent plate 70 is finished with a ground or frosted surface which catches and diffuses light reflected from mirror 68 to provide a uniform highly illuminated plane area behind the stack of cards. Operation is extremely simple. The selected term card or cards are moved one hole position to the side as in the apparatus of FIGURE 4 and the light is turned on. A bright spot of light then shows through at the hole positions designating the desired items. The serial numbers represented by the illuminated hole position may then be listed on note paper and the items pulled from the storage file by their numerical sequence. To simplify the listing of serial numbers it has been found advantageous to pre-print sheets of paper with the serial numbers of the hole positions and slip a sheet in front of plate 32. Pushing a hole in the sheet with a pointed instrument wherever light shows through provides a ready reference for pulling the desired items from the files.

While the present invention has been described as carried out in specific embodiments thereof, apparatus having considerable variance in size and complexity are readily visualized without departing from the inventive concept. Thus, it is not intended to be limited to these embodiments, but rather to cover the invention broadly within the spirit and scope of the appended claims.

What is claimed is:

1. An information retrieval card for recording information by the hole punch system comprising:
   (a) a first member having a first series of rows of apertures and a second series of rows of apertures therein, the rows of said second apertures occurring in alternating parallel relation with the rows of said first series; and
   (b) a second member of thermoplastic material adhered to said first member and having apertures therein corresponding with selected apertures of said first series of rows and providing a thermoplastic information receiving area corresponding with the apertures of said second series.

2. An information retrieval card as defined in claim 1 wherein said selected apertures include all of the apertures of said first series of rows.

3. A card according to claim 1 in which said thermoplastic is pigmented polyethylene.

4. A card according to claim 1 in which said thermoplastic has a thickness of about ¼ mile to 2 mils.

5. A method of peekaboo recording in which each record card represents a term and selected hole positions on a record card represent items comprising:
   (a) supporting a plurality of record cards in a stack,
   (b) moving the record cards representing the classification terms for the item to be recorded over one hole position with relation to the remainder of said plurality of record cards,
   (c) perforating the material in the holes at the item position with a hot punch, and
   (d) returning said record cards to their original positions.

6. A method of recording serialized filing information on a set of file cards without removing individual cards from the set comprising:
   (a) stacking in a support frame a set of file cards having a first series of rows of information receiving areas and a second series of pre-punched rows of holes alternating with said first series of rows of information receiving areas,
   (b) preparing the set to record an item to be filed by shifting file cards representing the classification terms for said item so that said first series of rows of information receiving areas in the shifted file cards fall in register with said second series of rows of holes in the unshifted file cards, and
   (c) recording said item in the information receiving area position representing the next item serial number in each of said shifted file cards by thermally perforating said information receiving area position in each of said shifted file cards.

7. A method of recording according to claim 5 in which said applied point of heat is in the range of 200 to 800 degrees Fahrenheit.

8. Apparatus for recording information on a set of cards adapted for peekaboo-type information storage and retrieval comprising:
   (a) a magazine for positioning and containing a set of peekaboo cards,
   (b) pin means operable to produce perforations in a set of peekaboo cards held in said magazine,
   (c) positioning means for aligning said pin means in any of a plurality of predetermined positions for producing perforations.
   (d) oven means for heating said pin means while in its inoperative position, and
   (e) actuating means for operatively advancing said pin means into said magazine at any selected one of said predetermined positions.

References Cited

UNITED STATES PATENTS

| | | | |
|---|---|---|---|
| 2,244,231 | 6/1941 | Armbruster | 235—61.12 |
| 3,134,834 | 5/1964 | Tobias, et al. | 235—61.12 |
| 2,350,382 | 6/1944 | Angel | 235—61.12 |
| 2,374,706 | 5/1945 | Saslaw | 83—16 |
| 2,510,383 | 6/1950 | Dalgleish | 83—16 |
| 3,075,573 | 1/1963 | Piazze | 83—171 |
| 3,199,388 | 8/1965 | Redfield | 83—16 |

MAYNARD R. WILBUR, Primary Examiner

M. K. WOLENSKY, Assistant Examiner

U.S. Cl X.R.

83—23, 171; 235—61.12; 346—76